H. Saggs,
Fruit Knife.
No. 99,119.          Patented Jan. 25, 1870.
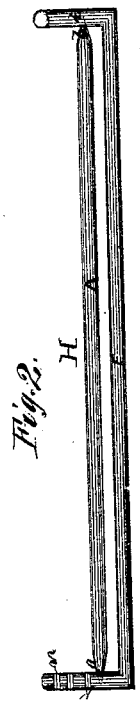
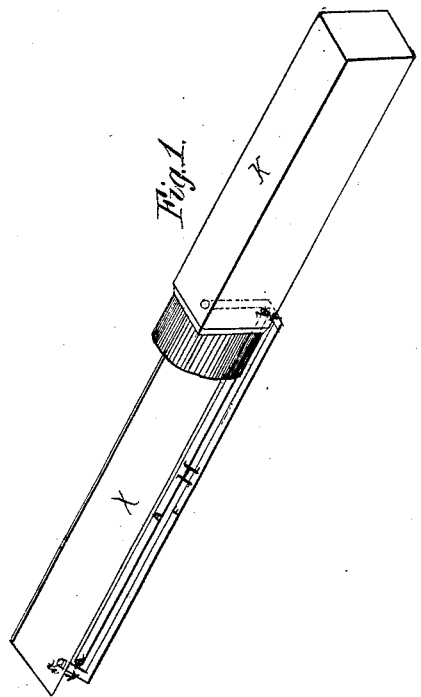
Witnesses
Sarah M. Brown
J. B. Dunton
Inventor
Henry Saggs

United States Patent Office.

HENRY SOGGS, OF COLUMBUS, PENNSYLVANIA.

Letters Patent No. 99,119, dated January 25, 1870.

IMPROVED VEGETABLE AND FRUIT-PARING KNIFE.

The Schedule referred to in these Letters Patent and making part of the same.

To all whom it may concern:

Be it known that I, HENRY SOGGS, of Columbus, county of Warren, and State of Pennsylvania, have invented a new and useful Improvement in Guards for Paring-Knives and Slicers for Paring Fruit and Vegetables; and I do hereby declare that the following is a full, clear, and exact description of the construction and operation of the same, reference being had to the annexed drawings, making a part of this specification, in which—

Figure 1 is a perspective view of a knife, with the guard attached thereto, and

Figure 2 is a plan view of the guard detached from the knife.

The object of my improvement is to reduce the friction between the knife and the adjustable bar E of the guard H, and thus prevent it from clogging.

To accomplish this, I make the arms $k$ $h$ long enough to admit a roller, A, between the bar E and knife-blade $x$.

The roller turns about the points $a$ and $b$, as the parings pass between it and the knife.

$n$ are notches on the arm $k$ of the guard H, for adjusting the same to the thickness of the paring required.

Having thus fully described my invention,

What I claim as my improvement, and desire to secure by Letters Patent, is—

The revolving bar A, in combination with the guard H, provided with the notches $n$, for adjusting the same, constructed as herein shown and described, for the purpose specified.

HENRY SOGGS.

Witnesses:
  SARAH M. BROWN,
  J. B. DUNTON.